US012655254B2

(12) United States Patent
Tsutsumi et al.

(10) Patent No.: US 12,655,254 B2
(45) **Date of Patent: *Jun. 16, 2026**

(54) PHOTOCURABLE MALEIMIDE RESIN COMPOSITION

(71) Applicant: Shin-Etsu Chemical Co., Ltd., Tokyo (JP)

(72) Inventors: Yoshihiro Tsutsumi, Annaka (JP); Hiroyuki Iguchi, Annaka (JP); Yuki Kudo, Annaka (JP); Atsushi Tsuura, Annaka (JP); Tadaharu Ikeda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 804 days.

This patent is subject to a terminal disclaimer.

(21) Appl. No.: 17/834,495

(22) Filed: Jun. 7, 2022

(65) Prior Publication Data

US 2023/0040536 A1 Feb. 9, 2023

(30) Foreign Application Priority Data

Jul. 12, 2021 (JP) ................................. 2021-115064
Jul. 12, 2021 (JP) ................................. 2021-115065

(51) Int. Cl.
*C08G 73/10* (2006.01)

(52) U.S. Cl.
CPC ................................. *C08G 73/1071* (2013.01)

(58) Field of Classification Search
CPC ........................... C08G 73/1071; C08G 73/12; C08G 73/1082; C08L 79/085; C08L 2205/025; C08K 5/5425; C08F 222/402; C08F 2/50; C09D 4/00; C09J 4/00; G03F 7/031
See application file for complete search history.

(56) References Cited

U.S. PATENT DOCUMENTS

| | | | | |
|---|---|---|---|---|
| 4,564,663 | A | * | 1/1986 | Martin .................... C08F 22/40 526/262 |
| 8,710,682 | B2 | * | 4/2014 | Dershem ............... H01L 21/314 257/E21.258 |
| 9,771,519 | B2 | * | 9/2017 | Katano .................. C09K 19/24 |
| 10,294,324 | B2 | * | 5/2019 | Yamaguchi ............. C08L 63/00 |
| 10,575,402 | B2 | * | 2/2020 | Abe ...................... C08K 5/5435 |
| 10,831,101 | B2 | * | 11/2020 | Yorisue ................... C08L 77/00 |
| 2002/0177638 | A1 | * | 11/2002 | Sakurai .................... C08K 5/14 524/94 |
| 2017/0058102 | A1 | * | 3/2017 | Kushihara ............ C08G 73/128 |

| | | | | |
|---|---|---|---|---|
| 2021/0061955 | A1 | * | 3/2021 | Iguchi ................. C08F 283/045 |
| 2021/0206892 | A1 | | 7/2021 | Kumazawa et al. |
| 2021/0301133 | A1 | * | 9/2021 | Mizori ................. C09D 179/08 |
| 2021/0371594 | A1 | * | 12/2021 | Kudo .................... C08G 73/128 |
| 2022/0179310 | A1 | | 6/2022 | Yamamoto et al. |
| 2023/0140237 | A1 | * | 5/2023 | Tsutsumi ................. C08J 5/244 428/473.5 |
| 2023/0143093 | A1 | * | 5/2023 | Tsuura ................. C09J 153/025 524/92 |
| 2023/0416466 | A1 | * | 12/2023 | Tsutsumi ............. C08G 73/128 |

FOREIGN PATENT DOCUMENTS

| | | | | |
|---|---|---|---|---|
| EP | 3 916 025 | A1 | 12/2021 | |
| JP | 2011-42711 | A | 3/2011 | |
| JP | 2019-173010 | A | 10/2019 | |
| JP | 2020-33470 | A | 3/2020 | |
| JP | 2020-33471 | A | 3/2020 | |
| JP | 2020-33472 | A | 3/2020 | |
| JP | 2020-525575 | A | 8/2020 | |
| WO | WO-0209123 | A1 | * 1/2002 ............... C08K 5/14 |
| WO | WO 2018/056466 | A1 | 3/2018 | |
| WO | WO 2018/237377 | A1 | 12/2018 | |
| WO | WO 2019/189467 | A1 | 10/2019 | |
| WO | WO 2020/045489 | A1 | 3/2020 | |
| WO | WO 2020/203834 | A1 | 10/2020 | |
| WO | WO 2020/282577 | A1 | 12/2020 | |

OTHER PUBLICATIONS

A. Székely et al. Molecular Radical Chain Initiators for Ambient- to Low-Temperature Applications. Chem. Asian J. 2019, 14, 105. [online], [retrieved on Feb. 7, 2025]. Retrieved from the internet <URL:https://aces.onlinelibrary.wiley.com/doi/epdf/10.1002/asia. 201801636> (Year: 2019).*
Japanese Office Action for Japanese Application No. 2021-115064, dated Jan. 4, 2024, with English translation.
Japanese Office Action for Japanese Application No. 2021-115065, dated Jan. 4, 2024, with English translation.
Japanese Office Action for Japanese Application No. 2021-115064, dated May 7, 2024, with English translation.
Japanese Office Action for Japanese Application No. 2021-115065, dated May 7, 2024, with English translation.

* cited by examiner

*Primary Examiner* — Sanza L. McClendon
(74) *Attorney, Agent, or Firm* — Birch, Stewart, Kolasch & Birch, LLP

(57) ABSTRACT

Provided is a photocurable maleimide resin composition that is superior in curability, and is capable of being turned into a cured product having superior dielectric properties, a high glass-transition temperature and a small coefficient of thermal expansion. The photocurable maleimide resin composition contains:

(A) a maleimide compound having, per each molecule, at least one saturated or unsaturated divalent aliphatic hydrocarbon group having 6 to 200 carbon atoms; and
(B) a photocuring initiator.

10 Claims, No Drawings

PHOTOCURABLE MALEIMIDE RESIN COMPOSITION

BACKGROUND OF THE INVENTION

Field of the Invention

The present invention relates to a photocurable maleimide resin composition.

Background Art

Photocurable resins (photosensitive resins) as typified by UV curable resins have already been used in many places. UV curable resins can be roughly categorized into a type that is curable by radical polymerization of an unsaturated double bond such as an acrylic group, and a type that is curable by cation polymerization of an epoxy group or the like; in general, and in many cases, these photocurable resins tend to have functional groups containing hetero atoms such as oxygen atoms, and the cured products thereof tend to exhibit large values of relative permittivity and dielectric tangent accordingly.

In recent years, a next-generation communication system known as 5G has been developed, where attempts are now being made to realize communication with a higher speed, a larger capacity and a lower delay as compared to the current situation. In order to realize these goals, a material for use in high-frequency bands will be required, and it is critical to reduce transfer loss as a countermeasure to noise. Thus, it is demanded that there be developed an insulation material superior in dielectric properties (low relative permittivity and low dielectric tangent), such as a binder resin used in a substrate, a wiring lamination material for semiconductors, and an adhesive agent for semiconductors.

As mentioned above, while many photocurable resins are inferior in dielectric properties (high relative permittivity and high dielectric tangent), there have been reports on solving these problems by employing a particular maleimide resin(s) that are colored but transparent (WO2018/56466, JP-A-2020-33470, JP-A-2020-33472, WO2020/45489 and WO2020/262577).

However, the particular maleimide compound(s) used in the above reports have many linear or branched alkyl groups, and tend to contribute to superior dielectric properties by lowing a cross-linking density. Meanwhile, as a negative effect(s) incurred by a low cross-linking density, it is known that there are problems such as large coefficients of thermal expansion (CTE) and low glass-transition temperatures (Tg).

As a method for solving these problems, there has been reported a use of a macromolecular aromatic maleimide compound (JP-A-2020-33471). It has become clear that a cured product of a composition containing such macromolecular aromatic maleimide compound has dielectric properties inferior to those derived from other resins (high relative permittivity and high dielectric tangent), and that such composition has a poor photocurability in the first place whereby the composition will be easily dissolved in a solvent when exposed thereto after being irradiated with a light.

SUMMARY OF THE INVENTION

Thus, it is an object of the present invention to provide a photocurable maleimide resin composition that is superior in curability, and is capable of being turned into a cured product having superior dielectric properties, a high glass-transition temperature and a small coefficient of thermal expansion.

The inventors of the present invention diligently conducted a series of studies to solve the above problems and completed the invention as follows. Specifically, the inventors found that the above object can be achieved with the flowing photocurable maleimide resin composition.

[1]
A photocurable maleimide resin composition comprising:
(A) a maleimide compound having, per each molecule, at least one saturated or unsaturated divalent aliphatic hydrocarbon group having 6 to 200 carbon atoms; and
(B) a photocuring initiator.

[2]
The photocurable maleimide resin composition according to [1], wherein the maleimide compound as the component (A) is a bismaleimide compound having two maleimide groups per each molecule.

[3]
The photocurable maleimide resin composition according to [1] or [2], wherein the maleimide compound as the component (A) has at least one dimer acid skeleton-derived hydrocarbon group per each molecule.

[4]
The photocurable maleimide resin composition according to any one of [1] to [3], wherein the maleimide compound as the component (A) is a maleimide compound represented by the following formula (1)

(1)

wherein A independently represents a tetravalent organic group having a cyclic structure;
B independently represents a divalent aliphatic hydrocarbon group having 6 to 200 carbon atoms;
Q independently represents a divalent alicyclic hydrocarbon group having 6 to 60 carbon atoms, and having a cyclohexane skeleton represented by the following formula (2)

(2)

wherein $R^1$ independently represents a hydrogen atom or an alkyl group having 1 to 5 carbon atoms, and each of x1 and x2 independently represents a number of 0 to 4;
W is B or Q;
at least one of B and W is a dimer acid skeleton-derived hydrocarbon group;
n is 0 to 100, m is 0 to 200; and no restrictions are imposed on an order of each repeating unit identified by n and m, and a bonding pattern of the repeating units may be alternate, block or random.

[5]

The photocurable maleimide resin composition according to [4], wherein in the formula (1), n=0.

[6]

The photocurable maleimide resin composition according to [4], wherein A in the formula (1) is any one of the tetravalent organic groups represented by the following structural formulae:

-continued wherein bonds in the above structural formulae that are yet unbonded to substituent groups are to be bonded to carbonyl carbons forming cyclic imide structures in the formula (1).

[7]

The photocurable maleimide resin composition according to any one of [1] to [3], further comprising a polymerization inhibitor as a component (C).

[8]

The photocurable maleimide resin composition according to any one of [1] to [7], wherein the photocuring initiator as the component (B) is contained in an amount of 0.1 to 5.0 parts by mass per 100 parts by mass of the component (A).

[9]

The photocurable maleimide resin composition according to [7] or [8], wherein the polymerization inhibitor as the component (C) is contained in an amount of 0.01 to 0.50 parts by mass per 100 parts by mass of the component (A).

[10]

The photocurable maleimide resin composition according to any one of [1] to [9], further comprising an adhesion aid as a component (D).

[11]

The photocurable maleimide resin composition according to [10], wherein the adhesion aid as the component (D) has a functional group reactive with maleimide groups in the component (A).

The photocurable maleimide resin composition of the present invention is a photocurable resin composition capable of being turned into a cured product having superior dielectric properties (low relative permittivity and low dielectric tangent), a high glass-transition temperature and a small coefficient of thermal expansion. Further, the photocurable maleimide resin composition of the present invention is superior in curability in a way such that it will not be eluted in a solvent after being subjected to light irradiation. Thus, the photocurable maleimide resin composition of the present invention is useful as, for example, a protective film such as a wiring-interlayer insulation layer and a solder resist.

DETAILED DESCRIPTION OF THE INVENTION

The present invention is described in greater detail hereunder.

(A) Maleimide Compound Having Per Each Molecule at Least One Saturated or Unsaturated Divalent Aliphatic Hydrocarbon Group Having 6 to 200 Carbon Atoms A component (A) used in the present invention is a particular maleimide compound having, per each molecule, at least one saturated or unsaturated divalent aliphatic hydrocarbon group having 6 to 200 carbon atoms. By having the aliphatic hydrocarbon group, the cured product of a resin composition containing the same can exhibit an excellent dielectric properties.

It is preferred that the maleimide compound as the component (A) be a bismaleimide compound having two maleimide groups per each molecule, in terms of availability of a raw material(s) and stability of synthesis.

Among the divalent aliphatic hydrocarbon groups, it is more preferred that the maleimide compound as the component (A) has a dimer acid skeleton-derived hydrocarbon group.

The dimer acid mentioned here is a liquid dibasic acid whose main component is a dicarboxylic acid having 36 carbon atoms, and is produced by dimerizing an unsaturated fatty acid having 18 carbon atoms and whose raw material is a natural substance such as a vegetable fat or oil. The dimer acid is not limited to a single type of skeleton, but may have multiple types of structures, where there may exit several types of isomers thereof. Typical dimer acids are grouped into the categories of (a) linear type, (b) monocyclic type, (c) aromatic ring type, and (d) polycyclic type. In this specification, a dimer acid skeleton refers to a group derived from a dimer diamine having a structure established by substituting the carboxy group(s) in such dimer acid with a primary aminomethyl group. That is, it is preferred that the component (A) have, as a dimer acid skeleton, a group obtained by substituting the two carboxy groups in any of the dimer acids represented by the following (a) to (d) with methylene groups.

Further, when the maleimide compound as the component (A) has a dimer acid skeleton-derived hydrocarbon group(s), it is more preferred that such dimer acid skeleton-derived hydrocarbon group have a structure with fewer carbon-carbon double bonds therein as a result of a hydrogenation reaction, in terms of heat resistance and reliability of the cured product.

(a)

(b)

(c)

(d)

It is preferred that the maleimide compound as the component (A) be a maleimide compound represented by the following formula (1) and having at least one dimer acid skeleton per each molecule.

$$(1)$$

In the formula (1), A independently represents a tetravalent organic group having a cyclic structure; B independently represents a divalent aliphatic hydrocarbon group having 6 to 200 carbon atoms; and Q independently represents a divalent alicyclic hydrocarbon group having 6 to 60 carbon atoms, and having a cyclohexane skeleton represented by the following formula (2), $$(2)$$

wherein $R^1$ independently represents a hydrogen atom or an alkyl group having 1 to 5 carbon atoms; each of x1 and x2 independently represents a number of 0 to 4.

In the formula (1), W is B or Q, and at least one of B and W is a dimer acid skeleton-derived hydrocarbon group; n is 0 to 100, m is 0 to 200, and no restrictions are imposed on an order of each repeating unit(s) identified by n and m, where the bonding pattern of the repeating units may be alternate, block or random.

By using the maleimide compound represented by the formula (1), there can be obtained a highly reliable composition exhibiting excellent dielectric properties, a strong adhesive force to a copper foil and a high Tg, before and after curing.

Here, it is preferred that the maleimide compound as the component (A) be a bismaleimide compound having two maleimide groups per each molecule, in terms of availability of a raw material(s) and stability of synthesis.

Further, in the formula (1), Q independently represents a divalent alicyclic hydrocarbon group having 6 to 60, preferably 7 to 30, more preferably 8 to 20 carbon atoms, and having a cyclohexane skeleton represented by the following formula (2), $$(2)$$

wherein $R^1$ independently represents a hydrogen atom or an alkyl group having 1 to 5 carbon atoms; each of x1 and x2 independently represents a number of 0 to 4.

Here, specific examples of $R^1$ include a hydrogen atom, a methyl group, an ethyl group, a n-propyl group, an isopropyl group, a n-butyl group, an isobutyl group and a t-butyl group. Particularly, a hydrogen atom and a methyl group are preferred. Further, R's may be identical to or different from one another.

Also, each of x1 and x2 is independently a number of 0 to 4, preferably a number of 0 to 2. Here, x1 and x2 may be identical to or different from each other.

Specific examples of Q include the divalent alicyclic hydrocarbon groups represented by the following structural formulae:

wherein bonds in the above structural formulae that are yet unbonded to substituent groups are to be bonded to nitrogen atoms forming cyclic imide structures in the formula (1).

In the formula (1), W is B or Q. As for W, a structural unit having either B or Q will be determined depending on a difference(s) in production method.

In the formula (1), n is 0 to 100, preferably 0 to 60, more preferably 0 to 50; m is 0 to 200, preferably 0 to 50, more preferably 0 to 40. When n and m are in these ranges, it is suitable for achieving the effects of the present invention, and it is also suitable for improving a preservation stability and adhesive force of the photocurable resin composition.

When n and m are too large, a fluidity will be impaired such that a poor moldability may be exhibited.

In another perspective, particularly, in consideration of further satisfying all dielectric properties, glass-transition temperature, coefficient of thermal expansion and curability, it is preferred that n in the formula (1) be 1 to 100, more preferably 1 to 60, even more preferably 2 to 50; and that m in the formula (1) be 1 to 200, more preferably 1 to 50, even more preferably 3 to 40.

There are no restrictions on an order of each repeating unit(s) identified by n and m, where the bonding pattern of the repeating units may be alternate, block or random.

Further, in the formula (1), A independently represents a tetravalent organic group having a cyclic structure; particularly, it is preferred that the tetravalent organic group be any of the tetravalent organic groups expressed by the following formulae.

Further, in the formula (1), B independently represents a divalent aliphatic hydrocarbon group having 6 to 200, preferably 8 to 100, more preferably 10 to 50 carbon atoms. Particularly, it is preferred that B be a branched divalent hydrocarbon group obtained by substituting one or more hydrogen atoms in the above divalent aliphatic hydrocarbon group with an alkyl or alkenyl group(s) having 6 to 200, preferably 8 to 100, more preferably 10 to 50 carbon atoms. The branched divalent hydrocarbon group may be either a saturated aliphatic hydrocarbon group or an unsaturated hydrocarbon group, and an alicyclic structure or an aromatic ring structure may be present in the midway of the molecular chain.

One specific example of the abovementioned branched divalent hydrocarbon group may be a divalent hydrocarbon group derived from a dual-end diamine called dimer diamine. Here, dimer diamine is a compound derived from a dimer of an unsaturated fatty acid such as oleic acid (i.e. dimer acid); thus, it is particularly preferred that B be a group obtained by substituting the two carboxy groups in any of the dimer acids represented by the above (a) to (d) with methylene groups.

There are no particular restrictions on a number average molecular weight of the maleimide compound as the component (A); in terms of handling property of the composition, this number average molecular weight is preferably 800 to 50,000, more preferably 900 to 30,000. Further, one kind of the component (A) may be used alone, or two or more kinds thereof may be used in a mixed form.

Here, the number average molecular weight mentioned in this specification refers to a number average molecular weight measured by gel permeation chromatography (GPC) under the following conditions, and using polystyrene as a reference material.

Measurement Conditions
    Developing solvent: Tetrahydrofuran (THF)
    Flow rate: 0.35 mL/min
    Detector: Refractive index detector (RI)
    Column: TSK Guardcolumn Super H-L
        TSK gel Super HZ4000 (4.6 mmI.D.×15 cm×1)
        TSK gel Super HZ3000 (4.6 mmI.D.×15 cm×1)
        TSK gel Super HZ2000 (4.6 mmI.D.×15 cm×2)
(All manufactured by TOSOH CORPORATION)
Column temperature: 40° C.
Sample injection volume: 5 μL (THF solution having a concentration of 0.2% by mass)

It is preferred that the component (A) be added by an amount of not smaller than 50% by mass, more preferably not smaller than 60% by mass, even more preferably not smaller than 75% by mass, with respect to a sum total of the photocurable resin.

(B) Photocuring Initiator

A photocuring initiator as a component (B) is added to promote a cross-linking reaction of the maleimide compound as the component (A), and a cross-linking reaction between the maleimide groups in the component (A) and the reactive group(s) reactive therewith. Further, the photocuring initiator may also be used in combination with a photosensitizer such as an amine compound, a urea compound, a sulfur-containing compound, a phosphorus-containing compound and a nitrile compound.

There are no particular restrictions on such photocuring initiator so long as it is capable of initiating a reaction by light. Examples of the photocuring initiator include an aromatic ketone such as 2-benzyl-2-dimethylamino-1-(4-morpholinophenyl)-butanone-1,2,2-dimethoxy-1,2-diphenylethane-1-one, 1-hydroxy-cyclohexyl-phenyl-ketone, 2-methyl-1-(4-(methylthio)phenyl)-2-morpholinopropanone-1,2,4-diethylthioxanthone, 2-ethylanthraquinone and phenanthrenequinone; a benzyl derivative such as benzyldimethylketal; a 2,4,5-triarylimidazole dimer such as 2-(o-chlorophenyl)-4,5-diphenylimidazole dimer, 2-(o-chlorophenyl)-4,5-di(m-methoxyphenyl)imidazole dimer, 2-(o-fluorophenyl)-4,5-phenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer and 2-(2,4-dimethoxyphenyl)-4,5-diphenylimidazole dimer; an acridine derivative such as 9-phenylacridine and 1,7-bis(9, 9'-acridinyl)heptane; a bisacylphosphine oxide such as bis(2,6-dimethoxybenzoyl)-2,4,4-trimethyl-pentylphosphine oxide and bis(2,4,6-trimethylbenzoyl)-phenylphosphine oxide; an alkylphenone-based compound such as 1-hydroxy-cyclohexyl-phenyl-ketone and 2-benzyl-2-dimethyl-amino-1-(4-morpholinophenyl)-butanone-1,2-(dimethyl-amino)-2-[(4-methylphenyl)methyl]-1-[4-(4-morpholinyl) phenyl]-1-butanone; and an acylphosphine oxide-based compound as well as benzophenone compound, such as 2,4,6-trimethylbenzoyl-diphenyl-phosphine oxide.

The photocuring initiator as the component (B) is preferably contained in an amount of 0.1 to 5.0 parts by mass, more preferably 0.2 to 4.5 parts by mass, even more preferably 0.5 to 4.0 parts by mass, per 100 parts by mass of the component (A).

Further, if the composition of the present invention contains a later-described photocurable resin which is other than the component (A) and has a reactive group(s) reactive with maleimide groups, the component (B) is preferably contained in an amount of 0.1 to 7.0 parts by mass, more preferably 0.2 to 6.0 parts by mass, even more preferably 0.5 to 5.0 parts by mass, per 100 parts by mass of a sum total of the component (A) and the photocurable resin which is other than the component (A) and has a reactive group(s) reactive with maleimide groups (the two components may altogether be simply referred to as "photocurable resin component" hereunder).

When the amount of the component (B) added is smaller than 0.1 parts by mass per 100 parts by mass of the component (A), the progress of photocuring may be slow. When the amount of the component (B) added is larger than 5.0 parts by mass per 100 parts by mass of the component (A), a lack of preservation stability may be observed even when containing the polymerization inhibitor.

Further, one kind of the component (B) may be used alone, or two or more kinds thereof may be used in a mixed form.

If necessary, various additives may be added to the photocurable maleimide resin composition of the present invention provided that the effects of the present invention will not be impaired. Examples of such other additives are as follows.

(C) Polymerization Inhibitor

A polymerization inhibitor as a component (C) may also be added to the photocurable maleimide resin composition of the present invention. The polymerization inhibitor is added to improve the preservation stability of the photocurable resin composition of the present invention, and there are no particular restrictions imposed thereon so long as it is capable of improving the preservation stability.

As such polymerization inhibitor, there may be listed, for example, not only those that are generally used, such as catechol, resorcinol and 1,4-hydroquinone, but also an alkyl catechol-based compound such as 2-methylcatechol, 3-methylcatechol, 4-methylcatechol, 2-ethylcatechol, 3-ethylcatechol, 4-ethylcatechol, 2-propylcatechol, 3-propylcatechol, 4-propylcatechol, 2-n-butylcatechol, 3-n-butylcatechol, 4-n-butylcatechol, 2-tert-butylcatechol, 3-tert-butylcatechol, 4-tert-butylcatechol and 3,5-di-tert-butylcatechol; an alkylresorcinol-based compound such as 2-methylresorcinol, 4-methylresorcinol, 2-ethylresorcinol, 4-ethylresorcinol, 2-propylresorcinol, 4-propylresorcinol, 2-n-butylresorcinol, 4-n-butylresorcinol, 2-tert-butylresorcinol and 4-tert-butylresorcinol; an alkylhydroquinone-based compound such as methyl hydroquinone, ethyl hydroquinone, propyl hydroquinone and tert-butyl hydroquinone; a phosphine compound such as tributylphosphine, trioctylphosphine, tricyclohexylphosphine and triphenylphosphine; a phosphine oxide compound such as trioctylphosphine oxide and triphenylphosphine oxide; a phosphite compound such as triphenylphosphine and trisnonylphenylphosphite; a hindered amine-based compound such as 2,2,6,6-tetramethylpiperidin-1-oxyl and 4-hydroxy-2,2,6,6-tetramethylpiperidin-1-oxyl; a naphthalene compound such as ammonium 1,4-dihydroxy-2-naphthalene sulfonate and 4-methoxy-1-naphthol, and a naphthoquinone compound such as 1,4-naphthoquinone, 2-hydroxy-1,4-naphthoquinone and anthrone; and a phenol-based antioxidant such as pyrogallol, phloroglucin and 4,4'-butylidene-bis(6-tert-butyl-m-cresol).

The polymerization inhibitor as the component (C) is preferably contained in an amount of 0.01 to 0.50 parts by mass, more preferably 0.02 to 0.45 parts by mass, even more preferably 0.03 to 0.40 parts by mass, per 100 parts by mass of the component (A).

Further, if the composition of the present invention contains the later-described photocurable resin which is other than the component (A) and has a reactive group(s) reactive with maleimide groups, the component (C) is preferably contained in an amount of 0.01 to 0.70 parts by mass, more preferably 0.02 to 0.60 parts by mass, even more preferably 0.03 to 0.50 parts by mass, per 100 parts by mass of the photocurable resin component.

When the amount of the component (C) added is smaller than 0.01 parts by mass per 100 parts by mass of the component (A), there may be observed a weaker polymerization inhibition effect. When the amount of the component (C) added is larger than 0.50 parts by mass per 100 parts by mass of the component (A), not only the polymerization inhibition effect will peak out, and improvements in preservation stability cannot be much expected, but a curability may also be affected as well.

Further, one kind of the component (C) may be used alone, or two or more kinds thereof may be used in a mixed form.

(D) Adhesion Aid

An adhesion aid as a component (D) may also be added to the photocurable maleimide resin composition of the present invention. The adhesion aid is added to improve the adhesive force of the photocurable resin composition of the present invention.

The maleimide compound as the component (A) already has a strong adhesive force to metals, and then by adding the component (D), even an adhesive force of the composition to certain materials such as glass can be improved as well.

Examples of such adhesion aid may include a silane coupling agent, a triazole-based compound and a tetrazole-based compound.

There are no particular restrictions on the type of the adhesion aid; it is preferred that the adhesion aid has a functional group(s) reactive with the maleimide groups in the component (A). As a functional group reactive with the maleimide groups, there may be listed, for example, a maleimide group, an epoxy group, a (meth)acrylic group, a vinyl group, an allyl group, a phenolic hydroxyl group and an amino group. Particularly, it is preferred that there be contained at least one of a maleimide group and a (meth) acrylic group that are superior in photocurability.

Examples of the silane coupling agent include an epoxy group-containing alkoxysilane such as 3-glycidoxypropylt-rimethoxysilane, 3-glycidoxypropylmethyldimethoxysilane, 3-glycidoxypropyltriethoxysilane, 3-glycidoxypropylmeth-yldiethoxysilane and 2-(3,4-epoxycyclohexyl)ethylt-rimethoxysilane; a (meth)acrylic group-containing alkoxysi-lane such as 3-methacryloxypropyltrimethoxysilane, 3-methacryloxypropylmethyldimethoxysilane, 3-methacry-loxypropyltriethoxysilane, 3-methacryloxypropylmethyldi-ethoxysilane and 3-acryloxypropyltrimethoxysilane; an alk-enyl group-containing alkoxysilane such as vinyltrimethoxysilane and vinyltriethoxysilane; and an amino group-containing alkoxysilane such as N-2-(amino-ethyl)3-aminopropyltrimethoxysilane, N-2-(aminoethyl)3-aminopropylmethyldimethoxysilane, 3-aminopropylt-rimethoxysilane, 3-aminopropyltriethoxysilane and N-phenyl-3-aminopropyltrimethoxysilane.

Examples of the triazole-based compound include 1,2,3-triazole, 1,2,4-triazole, benzotriazol e and N-trim ethyl silyl-benzotriazole.

Examples of the tetrazole-based compound include 1H-tetrazole, 5-amino-1H-tetrazole, 5-phenyl-1H-tetrazole and 1-phenyl-5-mercapto-1H-tetrazole.

The adhesion aid as the component (D) is preferably contained in an amount of 0.01 to 10.0 parts by mass, more preferably 0.05 to 8.0 parts by mass, even more preferably 0.1 to 5.0 parts by mass, per 100 parts by mass of the component (A).

Further, if the composition of the present invention contains the later-described photocurable resin which is other than the component (A) and has a reactive group(s) reactive with maleimide groups, the component (D) is preferably contained in an amount of 0.01 to 12.0 parts by mass, more preferably 0.05 to 10.0 parts by mass, even more preferably 0.1 to 8.0 parts by mass, per 100 parts by mass of the photocurable resin component.

Furthermore, one kind of the component (D) may be used alone, or two or more kinds thereof may be used in a mixed form.

Photocurable Resin Having Reactive Group Reactive with Maleimide Group

The present invention may further contain a photocurable resin (A') which is other than the component (A) and has a reactive group(s) reactive with maleimide groups.

There are no restrictions on the type of such photocurable resin, examples of which may include various resins other than the component (A), such as an epoxy resin, a phenolic resin, a melamine resin, a silicone resin, a cyclic imide resin such as a maleimide compound other than the component (A), a urea resin, a heat-curable polyimide resin, a modified polyphenylene ether resin, a heat-curable acrylic resin, and an epoxy-silicone hybrid resin. Further, as a reactive group(s) reactive with maleimide groups, there may be listed, for example, an epoxy group, a maleimide group, a hydroxyl group, an acid anhydride group, an alkenyl group such as an allyl group and a vinyl group, a (meth)acrylic group, and a thiol group.

In terms of reactivity, it is preferred that the reactive group in the photocurable resin be a maleimide group and a (meth)acrylic group. However, the photocurable resin having the reactive group(s) reactive with maleimide groups is preferably added by an amount of 0 to 50% by mass, more preferably 0 to 40% by mass, even more preferably 0 to 25% by mass, with respect to the sum total of the photocurable resin.

Inorganic Filler

An inorganic filler may also be added to the present invention. The inorganic filler may be added to improve the strength and rigidity of the cured product of the photocur-able maleimide resin composition of the present invention, and adjust the coefficient of thermal expansion of such cured product as well as the dimensional stability thereof. As such inorganic filler, there may be used those that are generally added to an epoxy resin composition and a silicone resin composition. For example, there may be listed silicas such as a spherical silica, a molten silica and a crystalline silica; alumina; silicon nitride; aluminum nitride; boron nitride; barium sulfate; talc; clay; aluminum hydroxide; magnesium hydroxide; calcium carbonate; glass fibers; and glass par-ticles. Moreover, for the sake of improvements in dielectric properties, there may also be added a fluorine-containing resin, a coating filler and/or hollow particles. One kind of inorganic filler may be used alone, or two or more kinds thereof may be used in combination.

There are no particular restrictions on an average particle size and shape of the inorganic filler; preferred is a spherical silica having an average particle size of 0.5 to 5 μm. Here, the average particle size is a value obtained as a mass average value $D_{50}$ (or median diameter) in a particle size distribution measurement employing a laser diffraction method.

Further, for the sake of property improvement, it is preferred that the inorganic filler be such an inorganic filler that has already been surface-treated with a silane coupling agent having an organic group(s) reactive with maleimide groups. Examples of such silane coupling agent may include an epoxy group-containing alkoxysilane, an amino group-containing alkoxysilane, a (meth)acrylic group-containing alkoxysilane and an alkenyl group-containing alkoxysilane.

As such silane coupling agent, preferred are a (meth) acrylic group- and/or amino group-containing alkoxysi-lanes, specific examples of which include 3-methacryloxy-propyltrimethoxysilane, 3-acryloxypropyltrimethoxysilane, N-phenyl-3-aminopropyltrimethoxysilane, N-2-(amino-ethyl)-3-aminopropyltrimethoxysilane and 3-aminopropylt-rimethoxysilane.

In terms of light permeability, the inorganic filler is added by an amount of 0 to 70% by mass with respect to the sum total of the photocurable resin.

15

16

Others

Other than the above additives, there may also be added, for example, a non-functional silicone oil, a thermoplastic resin, a thermoplastic elastomer, an organic synthetic rubber, a photostabilizer, a flame retardant, a pigment and a dye.

Production Method

As a method for producing the photocurable maleimide resin composition of the present invention, there may be used, for example, a method of mixing the abovementioned components.

The photocurable maleimide resin composition of the present invention can also be dissolved into an organic solvent so as to be handled as a varnish; by mixing the abovementioned components with an organic solvent, the photocurable maleimide resin composition may be prepared as a varnish. There are no restrictions on the organic solvent so long as it is capable of dissolving the component (A) and the photocurable resin which is added as an other additive and has a reactive group(s) reactive with maleimide groups. Examples of the organic solvent may include anisole, xylene, toluene, tetrahydrofuran (THF), dimethylformamide (DMF), dimethylsulfoxide (DMSO) and acetonitrile. Any one kind of them may be used alone, or two or more kinds of them may be used in combination.

Also, if the component (A) is in the form of a liquid at room temperature, the components may be combined together and then mixed using, for example, a planetary mixer (by INOUE MFG., INC.) or a stirrer, THINKY CONDITIONING MIXER (by THINKY CORPORATION).

Also, the components may be preliminarily mixed together in advance, followed by using a melt-kneading machine to push them out into the shape of a sheet or a film so that the sheet or film can be used as it is. Further, such for purposes involving, for example, a photosensitive film, a photosensitive film with a support, an insulating resin sheet such as a prepreg, a circuit board (e.g. uses of laminate, multi-layered printed wiring board), a solder resist, an underfill material, a die bonding material, a semiconductor encapsulation material, a hole filling resin, a part embedding resin, and an adhesive agent for bonding metals. Particularly, the composition can be favorably used as a resin composition or solder resist for use in an insulation layer of a multi-layered printed wiring board. Further, if the composition is in the form of a liquid at room temperature, it is favorably used as an adhesive agent, especially as an adhesive agent for use in parts that cannot be exposed to too much heat.

The photocurable maleimide resin composition of the present invention is cured by light irradiation performed under conditions that are normally employed to cure a photocurable resin, the conditions including wavelength, illuminance and irradiation time etc.; for example, the composition cures when irradiated with a UV light of 365 nm or the like. Further, depending on intended uses, after performing photocuring under the above conditions, heat curing may then be performed under conditions of, for example, 180° C., 1 hour.

Working Examples

The present invention is described in detail hereunder with reference to working and comparative examples; the present invention shall not be limited to the following working examples.

(A) Maleimide Compound (A-1): Linear alkylene group-containing bismaleimide compound represented by the following formula (X-45-2600 by Shin-Etsu Chemical Co., Ltd.)

sheet- or film-shaped product may also be processed into granular or tablet shapes before use.

Intended Uses

The photocurable maleimide resin composition of the present invention may be used for purposes requiring an insulating resin composition; although not particularly limwherein —C$_{36}$H$_{72}$— represents a structure derived from a dimer acid skeleton.

n≈5 (Average value), m≈1 (Average value)

(A-2): Linear alkylene group-containing bismaleimide compound represented by the following formula (BMI-2500 by Designer Molecules Inc.)

65 ited, if the composition is a resin composition that can be turned into a film at room temperature, it may then be used wherein —C$_{36}$H$_{72}$— represents a structure derived from a dimer acid skeleton.

n≈5 (Average value), m≈1 (Average value)

(A-3): Linear alkylene group-containing bismaleimide compound represented by the following formula (BMI-3000 by Designer Molecules Inc.)

wherein —$C_{36}H_{72}$— represents a structure derived from a dimer acid skeleton.

m≈5 (Average value)

(A-4): 1,6-bismaleimide-(2,2,4-trimethyl)hexane (BMI-TMH by Daiwakasei Industry Co., LTD.)

(A') Photocurable resin having reactive group reactive with maleimide group (maleimide compound other than component (A))

(A'-5): Aromatic maleimide having the following structure (BMI-6100 by Designer Molecules Inc.)

wherein n≈8 (Average value), m≈1 (Average value)

(A'-6): 4,4'-diphenylmethanebismaleimide (BMI-1000 by Daiwakasei Industry Co., LTD.)

(A'-7): Bisphenol A-diphenylether bismaleimide (BMI-4000 by Daiwakasei Industry Co., LTD.)

(B) Photocuring Initiator (B-1): Bis(2,4,6-trimethylbenzoyl)-phenyl-phosphine oxide (Ominirad 819 by iGM Resins)

(C) Polymerization Inhibitor (C-1): 4,4'-butylidene-bis(6-tert-butyl-m-cresol) (AN-TAGE W-300 by Kawaguchi Chemical Industry Co., LTD.)

(D) Adhesion Aid (D-1): 3-methacryloxypropyltrimethoxysilane (KBM-503 by Shin-Etsu Chemical Co., Ltd.)

Working Examples 1 to 11, Comparative Examples
1 to 9

Preparation of Varnish

At the compounding ratios shown in Tables 1 to 4, the components shown in these Tables 1 to 4 were put into a 500 mL four-necked flask equipped with a Dimroth condenser and a stirrer, followed by performing stirring at 50° C. for two hours so as to obtain a resin composition in the form of a varnish.

Relative Permittivity, Dielectric Tangent, Glass-Transition Temperature, Coefficient of Thermal Expansion, Curability A roller coater was used to apply the varnish-like photo-curable cyclic imide resin composition prepared by the above method to a PET film having a thickness of 38 followed by drying the same at 100° C. for 10 min in the cases of working examples 1 to 8, 10 and 11 as wells as comparative examples 1, 2 and 5, and at 180° C. for 10 min in the cases of working example 9 and comparative examples 3, 4 and 6 to 9, thereby obtaining an uncured resin film having a thickness of 50 Next, the uncured resin film obtained was irradiated with a UV of 2,000 mJ/cm$^2$ for 3 sec so as to be photocured, thus obtaining a cured resin film.

A network analyzer (E5063-2D5 by Keysight Technologies) and a stripline (by KEYCOM Corporation) were then connected to this cured resin film to measure a relative permittivity and dielectric tangent thereof at a frequency of 10 GHz.

Further, the glass-transition temperature (Tg) and coefficient of thermal expansion (CTE, 0 to 40° C.) of the cured resin film were measured by DMA-800 manufactured by TA Instruments.

Also, in Tables 1 and 2, as for a weight of the photocured resin film before and after being immersed in anisole for six hours, curability was evaluated in such a manner that ○ was given to examples exhibiting a change in weight of not larger than 0.3% with respect to an initial weight, and that x was given to examples exhibiting a change in weight of greater than 0.3% with respect to the initial weight.

Further, in Tables 3 and 4, as for the weight of the cured resin film before and after being immersed in anisole for six hours, curability was evaluated in such a manner that ○ was given to examples exhibiting a change in weight of not larger than 0.1% with respect to an initial weight, and that x was given to examples exhibiting a change in weight of greater than 0.1% with respect to the initial weight.

Adhesiveness to Copper Foil

A roller coater was used to apply the varnish-like photo-curable cyclic imide resin composition prepared by the above method to a copper foil having a surface roughness of Rz=0.6 μm and a thickness of 18 μm (TQ-M4-VLP by MITSUI MINING&SMELTING CO., LTD.), followed by drying the same at 100° C. for 10 min so as to obtain an uncured resin film having a thickness of 50 μm on the copper foil. A glass slide (S1111 by Matsunami Glass Ind., Ltd.) was then laminated onto the surface of the copper foil on which the uncured resin film had been formed, via vacuum press (product name V-130 by Nikko-Materials Co., Ltd.) under conditions of 100° C., pressure of 0.3 MPa, 60 sec. Irradiation was then performed from the glass slide side with a UV light of 2,000 mJ/cm² for 3 sec to photocure the resin film, followed by additionally performing heating at 180° C. for an hour so as to thermally cure the same.

Adhesiveness was evaluated in accordance with JIS-C-6481 "Test methods of copper-clad laminates for printed wiring boards," where under conditions of temperature 23° C., tension rate 50 mm/min, there were measured a 90° peeling adhesion strength (kN/m) (initial value) at the time of peeling the copper foil of the adhesion test piece from the glass slide; and a 90° peeling adhesion strength (kN/m) at the time of peeling the copper foil of the adhesion test piece from the glass slide after the adhesion test piece had been left under 85° C. and 85% RH for 168 hours.

Varnish Stability

The varnish prepared by the above method was then put into a colorless and transparent glass bottle so as to observe the condition of the varnish prepared with the glass bottle itself being plugged. As shown in Tables 3 and 4, a varnish stability was evaluated in such a manner that A was given to examples where the varnish had a fluidity; B was given to examples where while the varnish had a fluidity, fine insoluble matters were confirmed to have occurred therein; and C was given to examples where the varnish had completely gelated and thus lost its fluidity.

Next, the plugged glass bottle containing the varnish was left in an incubator of 40° C. for two months. The condition of the varnish that had thus been left for two months was observed, and a varnish preservation stability was evaluated in such a manner that A was given to examples where the varnish maintained its fluidity; B was given to examples where while the varnish maintained its fluidity, fine insoluble matters were confirmed to have occurred therein; and C was given to examples where the varnish had completely gelated and thus lost its fluidity.

TABLE 1

| Composition compounding table | | | Working example | | |
|---|---|---|---|---|---|
| (part by mass) | | | 1 | 2 | 3 |
| (A) | X-45-2600 | A-1 | 100.0 | | 80.0 |
| | BMI-2500 | A-2 | | 100.0 | |
| | BMI-3000 | A-3 | | | 20.0 |
| (A') | BMI-6100 | A'-5 | | | |
| | BMI-1000 | A'-6 | | | |
| | BMI-4000 | A'-7 | | | |
| (B) | Omnirad 819 | B-1 | 1.0 | 1.0 | 1.0 |
| (C) | ANTAGE W-300 | C-1 | 0.1 | 0.1 | 0.1 |
| (D) | KBM-503 | D-1 | 0.5 | 0.5 | 0.5 |
| Solvent | Anisole | | 100.0 | 100.0 | 100.0 |
| | NMP | | | | |
| Evaluation result | Relative permittivity | | 2.5 | 2.6 | 2.5 |
| | Dielectric tangent | | 0.0015 | 0.0018 | 0.0015 |
| | Tg | ° C. | 135 | 125 | 120 |
| | CTE | ppm | 92 | 96 | 106 |
| | Curability | | ○ | ○ | ○ |
| | Initial peeling adhesion strength | kN/m | 0.9 | 0.8 | 1.1 |

TABLE 2

| Composition compounding table | | | Comparative example | | | |
|---|---|---|---|---|---|---|
| (part by mass) | | | 1 | 2 | 3 | 4 |
| (A) | X-45-2600 | A-1 | | | | |
| | BMI-2500 | A-2 | | | | |
| | BMI-3000 | A-3 | | | | |
| (A') | BMI-6100 | A'-5 | 100.0 | 100.0 | | |
| | BMI-1000 | A'-6 | | | 100.0 | |
| | BMI-4000 | A'-7 | | | | 100.0 |
| (B) | Omnirad 819 | B-1 | 1.0 | 10.0 | 1.0 | 1.0 |
| (C) | ANTAGE W-300 | C-1 | 0.1 | | 0.1 | 0.1 |
| (D) | KBM-503 | D-1 | 0.5 | 0.5 | 0.5 | 0.5 |
| Solvent | Anisole | | 150.0 | 150.0 | | |
| | NMP | | | | 100.0 | 100.0 |
| Evaluation result | Relative permittivity | | 2.8 | 2.8 | 3.5 | 3.1 |
| | Dielectric tangent | | 0.0075 | 0.0082 | 0.028 | 0.018 |
| | Tg | ° C. | 170 | 183 | 211 | 232 |
| | CTE | ppm | 71 | 60 | 51 | 50 |
| | Curability | | X | X | ○ | ○ |
| | Initial peeling adhesion strength | kN/m | 0.6 | 0.7 | 0.4 | 0.5 |

21

TABLE 3

| Composition compounding table | | | Working example | | |
|---|---|---|---|---|---|
| (part by mass) | | | 4 | 5 | 6 |
| (A) | BMI-3000 | A-3 | 100.0 | | 80.0 |
| | BMI-TMH | A-4 | | 100.0 | |
| (A') | BMI-1000 | A'-6 | | | 20.0 |
| | BMI-4000 | A'-7 | | | |
| (B) | Omnirad 819 | B-1 | 1.0 | 1.0 | 1.0 |
| (C) | ANTAGE W-300 | C-1 | 0.05 | 0.05 | 0.05 |
| (D) | KBM-503 | D-1 | 0.5 | 0.5 | 0.5 |
| Solvent | Anisole | | 100.0 | 100.0 | 100.0 |
| | NMP | | | | |
| Evaluation result | Varnish stability (after preparation) | | A | A | A |
| | Varnish stability (after two months) | | A | A | A |
| | Relative permittivity | | 2.5 | 2.8 | 2.7 |
| | Dielectric tangent | | 0.002 | 0.004 | 0.004 |
| | Curability | | ○ | ○ | ○ |
| | Initial peeling adhesion strength | kN/m | 1.5 | 1.0 | 1.4 |
| | Peeling adhesion strength after absorbing moisture | kN/m | 1.5 | 0.8 | 1.2 |

TABLE 4

| Composition compounding table | | | Working example | | | | | Comparative example | | | | |
|---|---|---|---|---|---|---|---|---|---|---|---|---|
| (part by mass) | | | 7 | 8 | 9 | 10 | 11 | 5 | 6 | 7 | 8 | 9 |
| (A) | BMI-3000 | A-3 | 100.0 | 100.0 | 100.0 | | | 100.0 | | | | |
| | BMI-TMH | A-4 | | | | 100.0 | 100.0 | | | | | |
| (A') | BMI-1000 | A'-6 | | | | | | | 100.0 | 100.0 | 100.0 | |
| | BMI-4000 | A'-7 | | | | | | | | | | 100.0 |
| (B) | Omnirad 819 | B-1 | 1.0 | 1.0 | 1.0 | 1.0 | 1.0 | | 1.0 | 1.0 | 1.0 | 1.0 |
| (C) | ANTAGE W-300 | C-1 | | | | | | | | | 0.05 | 0.1 |
| (D) | KBM-503 | D-1 | | 0.5 | 0.5 | | 0.5 | | | 0.5 | 0.5 | 0.5 |
| Solvent | Anisole | | 100.0 | 100.0 | | 100.0 | 100.0 | 100.0 | | | | |
| | NMP | | | | 100.0 | | | | 100.0 | 100.0 | 100.0 | 100.0 |
| Evaluation result | Varnish stability (after preparation) | | A | A | A | A | A | A | A | A | A | A |
| | Varnish stability (after two months) | | C | C | C | C | C | A | C | C | B | B |
| | Relative permittivity | | 2.5 | 2.5 | 2.5 | 2.8 | 2.8 | 2.5 | 3.4 | 3.5 | 3.5 | 3.1 |
| | Dielectric tangent | | 0.002 | 0.002 | 0.002 | 0.004 | 0.004 | 0.002 | 0.027 | 0.028 | 0.028 | 0.018 |
| | Curability | | ○ | ○ | ○ | ○ | ○ | X | ○ | ○ | ○ | ○ |
| | Initial peeling adhesion strength | kN/m | 1.3 | 1.5 | 1.5 | 0.8 | 1.0 | 0.3 | —** | 0.4 | 0.4 | 0.5 |
| | Peeling adhesion strength after absorbing moisture | kN/m | —* | 1.5 | 1.5 | —* | 0.8 | —* | —** | 0.1 | 0.1 | 0.2 |

*The Copper foil had already been peeled from the glass surface before performing the peeling test; the peeling strength to the copper foil failed to be measured due to an insufficient adhesive force to the glass.
**After curing, since peeling from the copper foil had already been observed due to an insufficient adhesive force, measurement was unable to be carried out.

As shown above, since the photocurable maleimide resin composition of the present invention can be turned into a cured product having superior dielectric properties (low relative permittivity and low tangent), a high glass-transition temperature and a small coefficient of thermal expansion, there was confirmed a usability thereof as a protective film such as a wiring-interlayer insulation layer and a solder resist. Further, the photocurable maleimide resin composition of the present invention is superior in dielectric properties (low relative permittivity and low dielectric tangent) and in preservation stability as well as adhesive force; there was confirmed the usability of the composition of the present invention as a protective film such as a wiring-interlayer insulation layer and a solder resist, and as an adhesive agent for use in a glass substrate or the like.

22

What is claimed is:
1. A photocurable maleimide resin composition for use in an insulation layer of a circuit board in which a copper foil is used to laminate the insulation layer, or in an adhesive for a glass substrate in which the glass substrate is used as at least one surface for an adhesion, comprising:
(A) a maleimide compound having, per each molecule, at least one saturated or unsaturated divalent aliphatic hydrocarbon group having 6 to 200 carbon atoms;
(B) a photocuring initiator;
(C) a polymerization inhibitor; and
(D) an adhesion aid having a functional group reactive with maleimide groups in the component (A), the adhesion aid comprising (a) a silane coupling agent having a maleimide group, (b) a triazole-based compound, (c) or a tetrazole-based compound,
wherein the photocuring initiator as the component (B) is contained in an amount of 0.1 to 5.0 parts by mass per 100 parts by mass of the component (A);
the polymerization inhibitor as the component (C) is contained in an amount of 0.01 to 0.50 parts by mass per 100 parts by mass of the component (A); and
the adhesion aid as the component (D) is contained in an amount of 0.1 to 5.0 parts by mass, per 100 parts by mass of the component (A).
2. The photocurable maleimide resin composition according to claim 1, wherein the maleimide compound as the component (A) is a bismaleimide compound having two maleimide groups per each molecule.
3. The photocurable maleimide resin composition according to claim 1, wherein the maleimide compound as the component (A) has at least one dimer acid skeleton-derived hydrocarbon group per each molecule.
4. The photocurable maleimide resin composition according to claim 1, wherein the maleimide compound as the component (A) is a maleimide compound represented by the following formula (1)

23

24

-continued (1)

wherein A independently represents a tetravalent organic group having a cyclic structure;

B independently represents a divalent aliphatic hydrocarbon group having 6 to 200 carbon atoms;

Q independently represents a divalent alicyclic hydrocarbon group having 6 to 60 carbon atoms, and having a cyclohexane skeleton represented by the following formula (2)

(2)

wherein $R^1$ independently represents a hydrogen atom or an alkyl group having 1 to 5 carbon atoms, and each of x1 and x2 independently represents a number of 0 to 4;

W is B or Q;

at least one of B and W is a dimer acid skeleton-derived hydrocarbon group;

n is 0 to 100, m is 0 to 200; and no restrictions are imposed on an order of each repeating unit identified by n and m, and a bonding pattern of the repeating units may be alternate, block or random.

5. The photocurable maleimide resin composition according to claim 4, wherein in the formula (1), n=0.

6. The photocurable maleimide resin composition according to claim 4, wherein A in the formula (1) is any one of the tetravalent organic groups represented by the following structural formulae:

wherein bonds in the above structural formulae that are yet unbonded to substituent groups are to be bonded to carbonyl carbons forming cyclic imide structures in the formula (1).

7. The photocurable maleimide resin composition according to claim 1, wherein the photocurable maleimide resin composition is used in an insulation layer of a circuit board in which a copper foil is used to laminate the insulation layer.

8. The photocurable maleimide resin composition according to claim 1, wherein the photocurable maleimide resin composition is used in an adhesive for a glass substrate in which the glass substrate is used as at least one surface for an adhesion.

9. A method for producing an insulation layer of a circuit board, comprising:

applying the photocurable maleimide resin composition according to claim 7 to laminate on a surface of a copper foil for use in a wiring of the circuit board; and curing the photocurable maleimide resin composition to form the insulation layer of the circuit board.

10. A method for adhering a glass substrate, comprising:

applying the photocurable maleimide resin composition according to claim 8 on a surface of one substrate and laminating another substrate thereon, wherein at least one of the substrates is the glass substrate; and curing the photocurable maleimide resin composition to adhere the substrates.

\* \* \* \* \*